United States Patent [19]
Cucchi et al.

[11] Patent Number: 6,072,905
[45] Date of Patent: Jun. 6, 2000

[54] METHOD OF MOTION ESTIMATION FOR IMAGE SEQUENCES, IN PARTICULAR FOR VIDEO SIGNAL PROCESSING

[75] Inventors: Silvio Cucchi, Gaggiano; Fabio Valente, Lonigo, both of Italy

[73] Assignee: Alcatel, Paris, France

[21] Appl. No.: 09/025,924

[22] Filed: Feb. 19, 1998

[30] Foreign Application Priority Data

Mar. 14, 1997 [IT] Italy .................................. MI97A0575

[51] Int. Cl.[7] ...................................................... G06K 9/36
[52] U.S. Cl. ............................................ 382/236; 382/232
[58] Field of Search ..................................... 382/236, 232, 382/238; 348/422

[56] References Cited

U.S. PATENT DOCUMENTS

| | | | |
|---|---|---|---|
| 5,710,603 | 1/1998 | Lee | 348/699 |
| 5,805,228 | 9/1998 | Proctor et al. | 348/422 |

FOREIGN PATENT DOCUMENTS 0643539  3/1995  European Pat. Off. ......... H04N 7/24

OTHER PUBLICATIONS

Senda et al., "Theoretical Background and Improvement of a Simplified Half–Pel Motion Estimation", Image Processing, 1996, Proceedings, International Conference, vol. 3, pp. 263–266.

"A Fast Feature–Based Block Matching Algorithm Using Integral Projections" by Joon–Seek Kim et al, IEEE Journal On Selected Areas in Communications, vol. 10, No. 5, Jun. 1992, pp. 968–971.

"Efficient Block Motion Estimation Using Integral Projections" K. Sauer, et al, IEEE Transactions on Circuits and Systems for Video Technology, vol. 6, No. 5, Oct. 1996, pp. 513–518.

*Primary Examiner*—Jose L. Couso
*Assistant Examiner*—Anh Hong Do
*Attorney, Agent, or Firm*—Ware, Fressola, Van Der Sluys & Adolphson LLP

[57] ABSTRACT

A method is described for estimating the motion for image sequences carrying out a decimation of the function used for the extraction of the characteristic parameters of an image block. The method is iterated by decreasing the function decimation and carrying out the block-matching on a set of the best matchings of the preceding steps. The method does not require the recalculation of the parameters on the reference image for each block to be matched; moreover, in the extraction of the characteristic parameters of a block, the use of the Integral Projections is not mandatory but one of the possible variants only (FIG. 1).

11 Claims, 4 Drawing Sheets

FIG.1

METHOD OF MOTION ESTIMATION FOR IMAGE SEQUENCES, IN PARTICULAR FOR VIDEO SIGNAL PROCESSING

BACKGROUND OF THE INVENTION

1. Technical Field

The present invention relates to the field of image signal processing, and more precisely to a method of motion estimation for image sequences based upon determination of motion vectors according to image block-matching operations.

2. Discussion of Related Art

The image signal coding, in particular the interframe one, is mainly used for a transmission of the encoded signal with the smallest possible band occupancy.

The motion estimation and compensation predictive coding particularly improves the image coding efficiency by calculating in a known manner a motion vector and prediction error which are both transmitted. It can be also advantageously used for image signal filtering, to improve subjective image signal quality.

One of the methods for obtaining the motion vector uses encoding algorithms called Block Matching Algorithms (BMA) which appears to be easier to be implemented (as compared with algorithms carrying out the comparison at pixel level), both in terms of amount of calculations to be carried out and of circuitry.

The state of the art, as to the block matching algorithms, is described e.g. in the article "A fast Feature—Based Block Matching Algorithms Using Integral Projections", by J. S: Kim and R. H: Park, IEEE J. Selected Areas in Comm., vol. 10, No. 5, June 1992.

The known block matching algorithms calculate the motion vector based on a block-by-block matching: the motion vector is the information relative to the position of the block having the maximum correlation value between subblocks in temporally adjacent frames.

In this article an improved algorithm is proposed with respect to the others therein described belonging to the state of the art, still appearing to be too heavy in terms of computational amount, said improved algorithm being based upon the combination of the known "Integralprojection" and "Three-step search" techniques, wherein the search of the best motion vector consists in comparing the parameters extracted from the blocks on a spatially decimated grid and in the iteration of the comparison for the best block-matching of the preceding step on a grid with reduced decimation.

As emphasized by the authors themselves in the article, this method allows a reduction by about one half of the computations to be carried out against the other known methods. This reduction however is still not enough to assure a real circuit implementation at not very high costs.

SUMMARY OF THE INVENTION

Therefore the object of the present invention is to overcome the aforesaid drawbacks and to provide a method of motion estimation for image sequences, in particular for video signal processing which is an integral part of the present description.

According to the present invention, a method of motion estimation for image sequences based upon determination of motion vectors according to image block-matching operation comprises the steps of extracting, from a reference image, first significant parameters, once per each image, extracting second significant parameters for each of the subdivision blocks of an image on which a motion estimation is carried out, matching of said first significant parameters with said second significant parameters of each block on a search area around said block, thus obtaining for each block a set of motion vectors on which a mean absolute error is calculated, carrying out, for each block, a choice of motion vectors for which the mean absolute error is less than a given value, and carrying out, for each block, a block-latching on the pixels relative to selected vectors only.

The method of the present invention requires no spatial decimation of the search, as in the method proposed in the above-mentioned article, but a decimation of the function used for extracting the characteristic parameters of an image block. In a variant the method is iterated by decreasing the decimation of the function and by executing the block-matching on a set of the best comparisons of the preceding step.

The method of the invention does not require the recalculation of parameters on the reference image for each block to be matched; moreover, in extracting the characteristic parameters of a block, the use of the integral projections technique is not mandatory, but it is only one of the possible variants.

The method according to the present invention provides for an iterative procedure based upon extraction of particularly significant parameters, from the image blocks whose motion is to be estimated and upon their matching with equivalent parameters of the reference image.

The main advantage obtained by using the method of the present invention is the substantial reduction in the amount of overall computations to be carried out by a factor of at least 10 as compared with the known methods, which directly results in an equivalent reduction of the implementation cost.

BRIEF DESCRIPTION OF THE DRAWING

Further objects and advantages of the present invention will be clear from the following detailed description of an embodiment thereof and from the accompanying drawings attached by way of a not limiting example wherein.

DETAILED DESCRIPTION OF THE EMBODIMENTS

The method of the invention will be described hereinafter having reference mainly to FIG. 1 and, at the same time to FIGS. 2, 3, 4 explaining special aspects.

Figure 1:
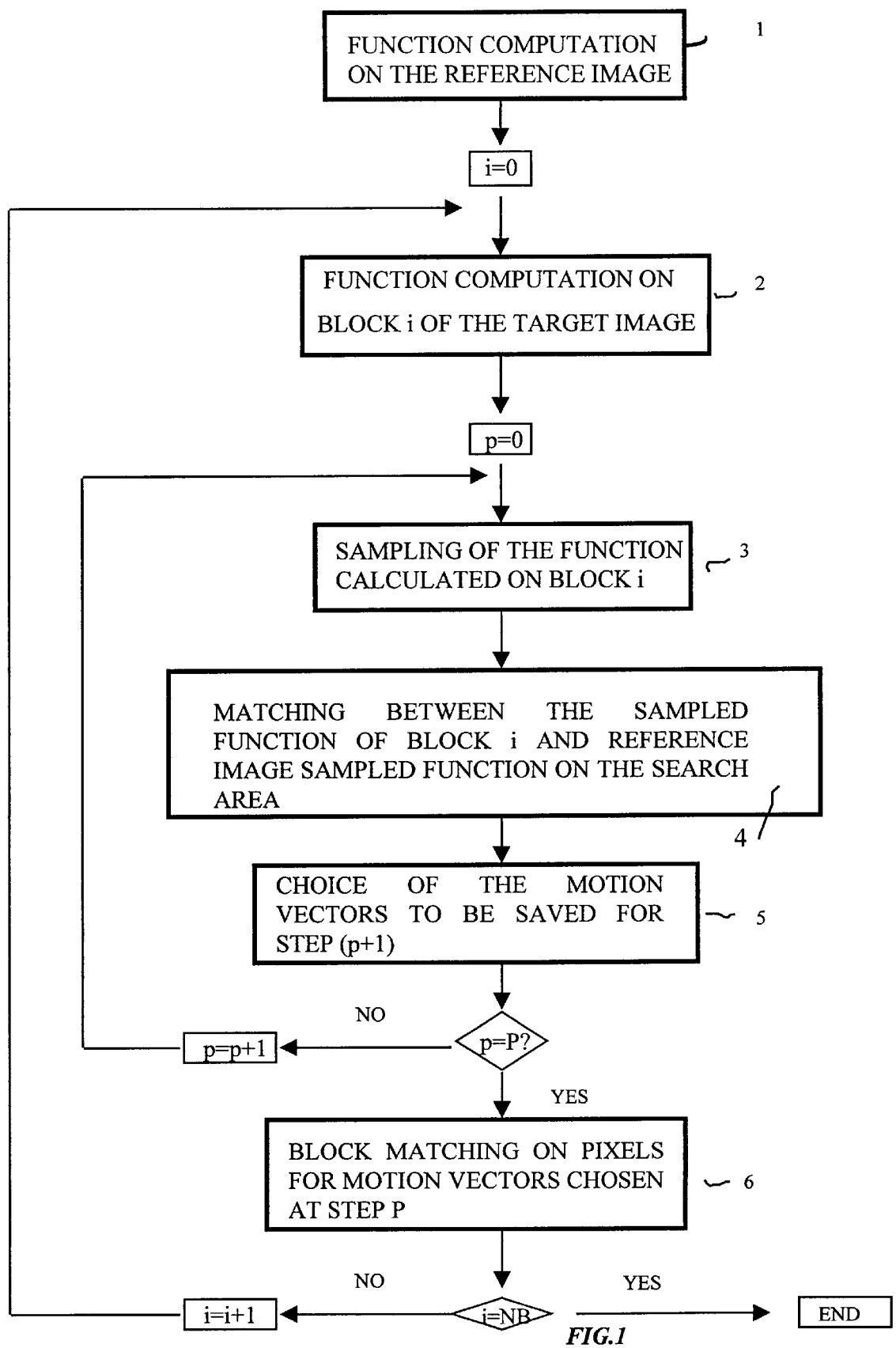
FIG. 1 is a flow chart of the steps of the motion estimation method according to the invention.

In FIG. 1 there is illustrated: by i the index of the block and by NB the number of the image blocks; by p the p-th step and by P the number of iterations of the algorithm for searching the best block-matching.

In step 2 of the flow chart shown in FIG. 1, for each block i of the image on which the motion estimation is to be made, a number of parameters are extracted characterizing the block in a significant manner: such operation is carried out by applying the selected function on the pixels of the block.

Figure 2:
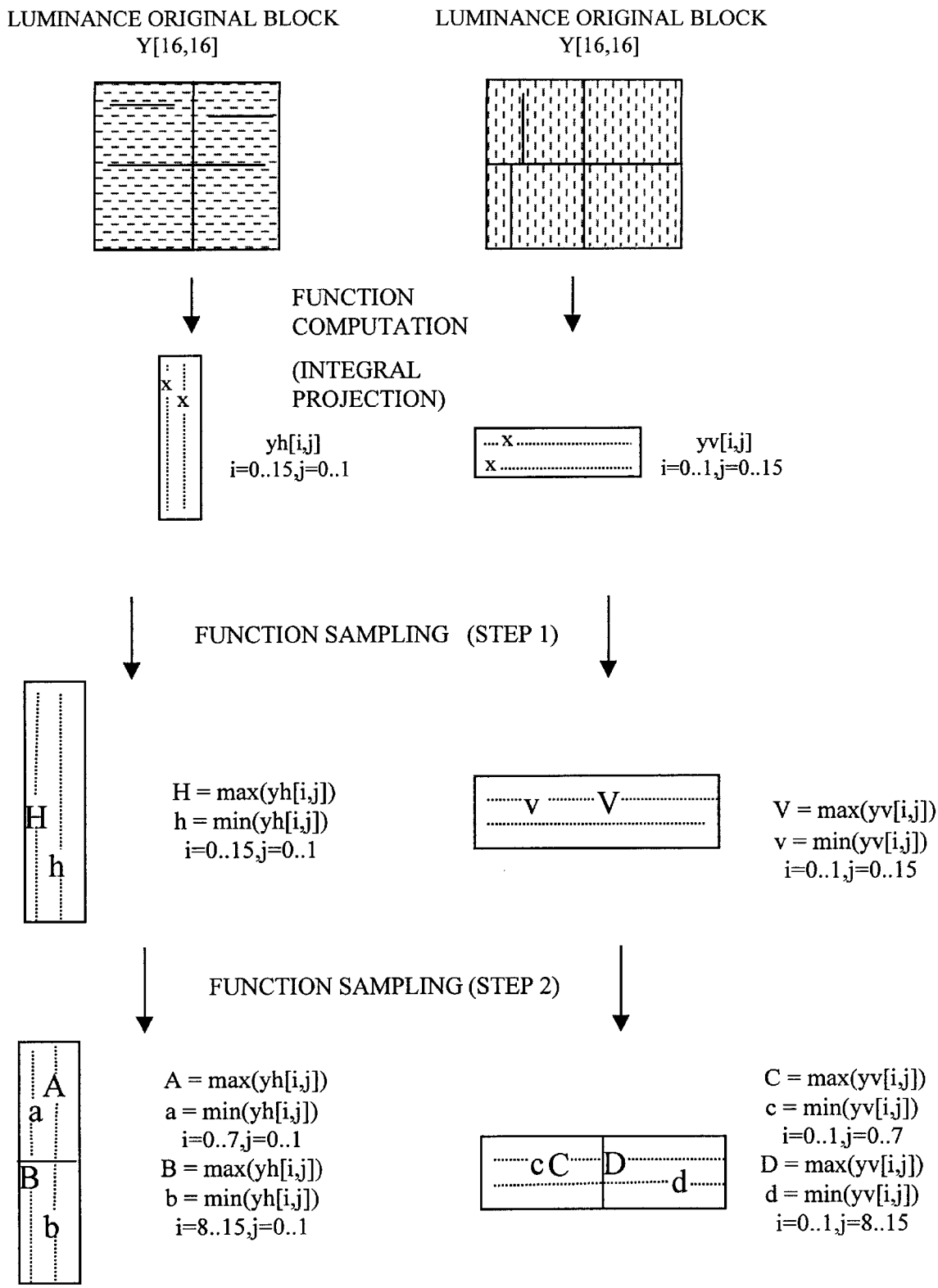
FIG. 2 shows a diagram explaining step 2 of FIG. 1.

The parameter extraction function hereinafter described as a not limiting example, represented in FIG. 2, is a good compromise between calculation simplicity and significancy of the parameters.

The application of the motion compensation method is assumed on a digital image with a standard format known as 4:2:2, wherein the two chrominance components are sampled horizontally by a factor 2 with respect to the luminance component. The luminance blocks, on which the motion estimation is made, have a 16×16 size, corresponding to two 16×8 chrominance blocks; the method however can be extended to other formats of the processing block by normal knowledge.

Let y be the 16×16 pixel luminance block (size of encoding blocks e.g. in MPEG Standard), with i, j being the pixel indexes, the following 64 characteristic parameters of the block are extracted:

$$yv[i,j] = Y[i^*8][j] + \sum_{k=1}^{7}(Y[i^*8+k][j] + W^*(Y[i^*8+k][j] - Y[i^*8+k-1][j])) \quad [1]$$

with $i = 0...1, j = 0...15$ $$yh[i,j] = y[i][j^*8] + \sum_{k=1}^{7}(y[i][j^*8+k] + W^*(y[i][j^*8+k] - y[i][j^*8+k-1])) \quad [2]$$

with $i = 0...15, j = 0...1$ where yv[i,j] and yh[i,j] are the vertical and horizontal components of the luminance signal respectively.

W is a weighting of the discrete derivative function of y which, through weighting, takes into account the amount of difference between adjacent pixels and, therefore, of the image granularity.

It can be noted that no spatial decimation of the samples is carried out. Similar computations can be done on the 16×8 pixel chromiance blocks cb and cr, i, j being the pixel indexes, bearing in mind that, being the chrominance sampled horizontally, the odd pixels are created through interpolation of two adjacent even samples:

$$cbv[i,j] = cb[i^*8][j] + \sum_{k=1}^{7}(cb[i^*8+k][j] + W^*(cb[i^*8+k][j] - cb[i^*8+k-1][j])) \quad [3]$$

with $i = 0...1, j = 0...15$ $$cbh[i,j] = cb[i][j^*8] + \sum_{k=1}^{7}(cb[i][j^*8+k] + W^*(cb[i][j^*8+k] - cb[i][j^*8+k-1])) \quad [4]$$

with $i = 0...15, j = 0...1$ crv[i][j] and crh[i][j] are obtained in a similar manner. cbv[i,j], cbh[i,j], crv[i][j] and crh[i][j] denote the vertical and horizontal components of the two chrominance signals, respectively.

The parameters obtained from chrominances are summed up in a weighted manner, through a coefficient K-croma, with the values obtained on the luminances, to obtain parameters v[i,j] and h[i,j] characterizing the block to be compensated, which, according to one of the characterizing aspects of the present invention, also take the chrominance components of the block into account:

$$v[i,j]=yv[i,j]+K\_croma^*(cbv[i,j]+crv[i,j]) \text{ where } K\_croma>=0 \quad [5]$$

$$h[i,j]=yh[i,j]+K\_croma^*(cbh[i,j]+crh[i,j]) \text{ where } K\_croma>=0 \quad [6]$$

Figure 3:
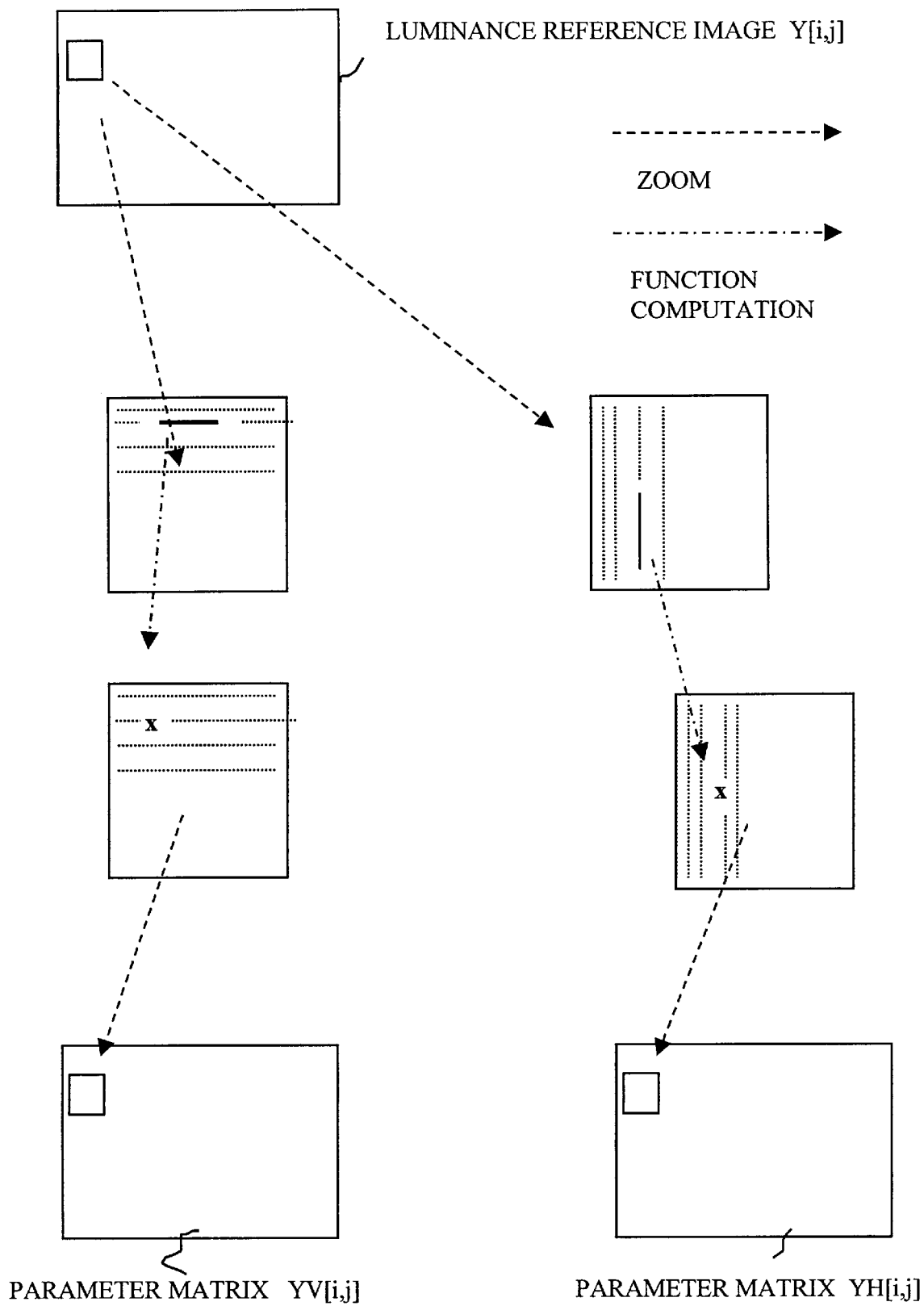
FIG. 3 shows a diagram explaining step 1 of FIG. 1.

By applying the same calculation on the reference image with respect to which the block motion is to be estimated, as represented in FIG. 3, and with reference to block 1 of FIG. 1 the following two parameter matrices are obtained:

$$YV[i,j] = Y[i][j] + \sum_{k=1}^{7}(Y[i+k][j] + W^*(Y[i+k][j] - Y[i+k-1][j])) \quad [7]$$

where $i = 0...(576-8), j = 0...720$ $$YH[i,j] = Y[i][j] + \sum_{k=1}^{7}(Y[i][j+k] + W^*(Y[i][j+k] - Y[i][j+k-1])) \quad [8]$$

where $i = 0...576, j = 0...(720-8)$

YV[i,j] and YH[i,j] denote the vertical and horizontal components of the luminance signal Y. The indexes i, j, vary in a range corresponding to the European digital television standard, but other standards are applicable as well.

The vertical and horizontal components of the chrominance signals CRV[I,J], CBV[i,j], CRH[i,j] and CBH[i,j] are obtained in a similar way.

The following parameters characterizing the parameter matrix extracted from the reference image are thus obtained:

$$V[i,j]=YV[i,j]+K\_croma^*(CBV[i,j]+CRV[i,j]) \quad [9]$$

$$H[i,j]=YH[i,j]+K\_croma^*(CBH[i,j]+CRH[i,j]) \quad [10]$$

It is emphasized here that such operations on the reference image (block 1 in FIG. 1) are carried out once only, and are not repeated at every block-matching as usually occurs in the motion estimation algorithms based upon block-matching.

Generally it can be said that the significant parameters of a block are extracted by integrating its representative function and its first derivative along a number of integration paths thus obtaining one or more parameter matrices from the reference image.

According to a variant of the method of the invention, the sampling step 3 of FIG. 1 is not carried out, while the match contemplated at step 4, described hereinafter, is directly carried out once on all parameters extracted from the block at preceding step 2. In this case P=0.

Figure 4:
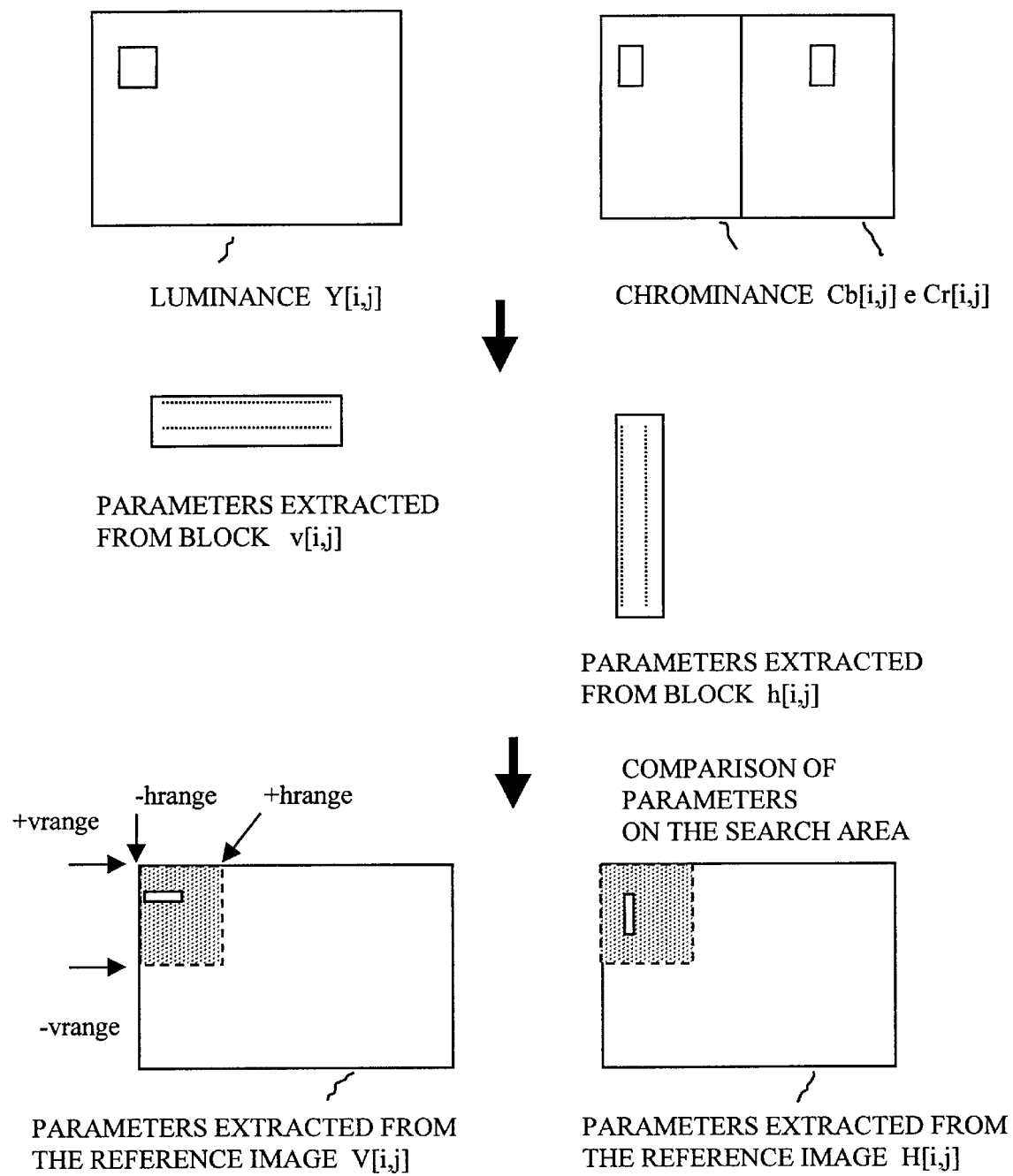
FIG. 4 shows a diagram explaining step 4 of FIG. 1.

The motion estimation is carried out by matching the parameters representative of the block and the reference image ones over a suitable search area around the block, as represented in FIG. 4, that corresponds to block 4 of FIG. 1:

$$MAE\_V[i,j] = \sum_{k1=0}^{1}\sum_{k2=0}^{15}|V[i+k1][j+k2] - v[k1][k2]| \quad [11]$$

$$MAE\_H[i,j] = \sum_{k1=0}^{15}\sum_{k2=0}^{1}|H[i+k1][j+k2] - h[k1][k2]| \quad [12]$$

where MAE_V e MAE_H represent the Mean Absolute Error in the match, whilst i=−hrange . . . +hrange, j= −vrange . . . +vrange define the search area of the motion compensation and also the motion vector indexes.

Compared with an exhaustive block-matching on the pixels, a reduction (in this special case) to one fourth in the number of operations to be executed is obtained, because an exhaustive block-matching on the parameters is carried out.

The exhaustive block-matching on the pixels (step 6 in FIG. 1) is computed for a given number of vectors [i,j] that achieve the best block matching, i.e. having the smallest sum MAE=MAE_H+MAE_V, choice made at step 5 of FIG. 1.

In accordance with another variant, the method described above can be modified by adding step 3 of FIG. 1 so as to reduce, even more drastically, the number of operations required, with performances still adequate for the purpose. The simplification consists in an iterative procedure that does not carry out the matching of all extracted parameters, but only of the most significant ones, extracted according to a sampling operation described below, and at each step it repeats the operation taking a greater number of parameters into account, but carrying out the matching only for those locations which had given the best results at the preceding step.

It is emphasized here that anyhow this method is based on a decimation of the function, which the parameter extraction is based on, and not upon the spatial decimation of the search grid as in the known art.

In particular, referring, still as a not limiting example, to FIG. 2, third step, corresponding to step 3 of FIG. 1, one starts doing matching for all positions in the search area of the following four block parameters:

$$V=\max(v[i,j]), v=\min(v[i,j]), i=0\ldots 1, j=0\ldots 15 \quad [13]$$

$$H=\max(h[i,j]), h=\min(h[i,j]), i=0\ldots 15, j=0\ldots 1 \quad [14]$$

The calculation of the MAE (matching contemplated at step 4, FIG. 1), is not carried out on all indexes, but only on the four ones found in [13] and [14].

At next step 5, FIG. 1, a number of search locations are eliminated by the subsequent matchings, i.e. those giving the highest results in terms of MAE according to such matchings, i.e. half. On the remaining ones the iteration is carried out again, thus going back to step 3 and incrementing number p; a more accurate block-matching is now carried out using the following eight parameters:

$$A=\max(h[i,j]), a=\min(h[i,j]), i=0\ldots 7, j=0\ldots 1 \quad [15]$$

$$B=\max(h[i,j]), b=\min(h[i,j]), i=8\ldots 15, j=0\ldots 1 \quad [16]$$

$$C=\max(v[i,j]), c=\min(v[i,j]), i=0\ldots 1, i=0\ldots 7 \quad [17]$$

$$D=\max(v[i,j]), d=\min(v[i,j]), i=0\ldots 1, j=8\ldots 15 \quad [18]$$

The procedure is repeated for a number of iterations, until p=P. At each iteration, the number of parameters is doubled and the number of locations (motion vectors), on which the matching is carried out, is halved. The P value is determined on the basis of the overall number of block-matchings on the pixels which one desires to carry out.

Thus the matching operation, carried out at step 6, is reduced to a limited number of motion vectors (e.g. 16) for which a bloch-matching is carried out on the pixels. In the most simplified version, only the best of motion vectors is selected.

Once the motion vectors, on which matchings are to be carried out, have been determined, the operation carried out at step 6 is known per se.

The particular case described herein can be generalized by varying the number of matched parameters and the number of motion vectors discarded at each iteration. The ratio between the number of computations required in the case herewith described, and those in an extensive block-matching over all the pixels is in the order of 1 to 30, if the extraction of parameters from the reference image and the computations required by the ordering of the results of matches between the parameters, are not taken into account.

One of the steps which could make the method more difficult is just the step n. 5, in FIG. 1, relating to the choice of locations to be saved for next step, in which a more accurate matching of the parameters is carried out. In order to avoid the consequent ordering operation of the results, a different technique has been used, which is based upon the assumption that the MAE distribution, calculated at step 5, is nearly Gaussian versus the motion vector indexes.

Then, the MAE values of block-matching greater than their average value are discarded at the first iteration of the second variant: this assures that, if the Gaussian assumption is satisfied, half of the block-matchings are discarded. In the following iteration, one takes into account that, having discarded the worse block-matchings, the distribution is no longer Gaussian, but it is approximately linear.

What is described hereinafter, is a particularly efficient method of calculating the barycenter of the assumed linear distribution: such barycenter is used as a threshold in the selection of the motion vectors that are saved for the next iteration.

In particular, let MAE_min, MAE_max and MAE_mean be the minimum, maximum and average MAE, respectively, obtained from block-matching at step 4, the following function is considered:

$$mae(MAE)=(MAE-MAE\_min)/(MAE\_max-MAE\_min) \quad [19]$$

which represents the MAE normalized between 0 and 1.

$$mae(MAE\_min) = 0 \quad [20]$$

$$mae(MAE\_max) = 1 \quad [21]$$

$$mae\_mean = mae(MAE\_mean) = \quad [22]$$
$$= (MAE\_mean\text{-}MAE\_min)/(MAE\_max\text{-}MAE\_min)$$

The probability distribution p(mae) of the normalized MAE is assumed to be linear, as said above, and therefore it has the following form:

$$p(mae)=a*mae+b \quad [23]$$

At this point, by imposing the integral of probability distribution p from 0 to 1 be unity and the integral of p(mae)*mae from 0 to 1 be equal to the normalized average mae-mean, the two distribution parameters a and b are obtained as a function of mae-mean. The normalized value mae of MAE for which the integral of p from 0 to mae has value ½ is a function of mae-mean, which is entered in a table.

From the mae value thus obtained, which forms the barycenter of the probability distribution of the normalized MAE, one deduces the barycenter of the probability distribution of the MAE:

$$\underline{MAE}=\underline{mae}*(MAE\_max-MAE\_min)+MAE\text{-}min \quad [24]$$

The value MAE is used as a threshold for separating the motion vectors, that are served for the next iteration, from those which are discarded.

Further variants of the method provide for maintaining, up to the final block-matchings on the pixels, some particularly significant motion vectors, besides those already obtained from the various iterations, such as, e.g., the null vector and the ones selected for the blocks directly adjacent, horizontally and vertically, to the block under process.

A further variant of the method allows the reduction in the number of matchings carried out on the pixels at step 6, but it can be applied only when the value W=0 is chosen for the weighting function, and therefore provides less accurate motion-vector estimates. It is based on the relation existing between the MAE of the block-matching on the pixels and that calculated on the parameters.

In particular, identifying by y the 16×16 block on which the motion compensation has to be carried out, as defined in [1] and [2] above, and by x the 16×16 block extracted from the reference image with respect to which the MAE of the block-matching on the pixels has to be evaluated, according to one of the special motion vectors whose indexes i and j have been chosen for the block-matching on pixels carried out at step 6, we have:

$$MAE\_BLOCK = \sum_{k1=0}^{15}\sum_{k2=0}^{15} |x[k1,k2] - y[k1,k2]| = \quad [25]$$

$$= \sum_{k1=0}^{15}\sum_{k2=0}^{7} |x[k1,k2] - y[k1,k2]| + \sum_{k1=0}^{15}\sum_{k2=8}^{15} |x[k1,k2] - y[k1,k2]| >=$$

$$>= \sum_{k1=0}^{15}\left|\sum_{k2=0}^{7} x[k1,k2] - y[k1,k2]\right| + \sum_{k1=0}^{15}\left|\sum_{k2=8}^{15} x[k1,k2] - y[k1,k2]\right| =$$

$$= MAE\_V[i,j]$$

The above formula relates to the not limiting case where null-weight is given also to the chrominance components with k_croma=0 in formulas [5] and [6]. The value of MAE_V[i,j] corresponds to the result of the matching of the parameters extracted from the block through vertical summation of the pixels (see [11]). Similarly, it is obtained:

$$MAE\_BLOCK[i,j] >= MAE\_H[i,j] \quad [26]$$

from which:

$$MAE\_BLOCK[i,j] >= (MAE\_H[i,j] + MAE\_V[i,j])/2 \quad [27]$$

Therefore, if one wishes to carry out the block-matching on blocks which gave the best result in the comparison of the parameters and called MAE_BLOCK_min the block-matching on the pixels with the minimum MAE between the blocks already matched, all blocks for which (MAE_H+ MAE_V)>=2*MAE_BLOCK_min can be discarded a priori, without carrying out the block-matching on the pixels.

A further variant of the method is related to step 2 of FIG. 1, explained better in FIG. 2: the summations of the equations referred to the case of the first variant, instead of being extended to the horizontal and vertical indexes i, j, can follow other oblique or broken lines according to pre-established paths.

Or, in addition, the motion estimation method can be extended to formats different from the 4:2:2, like e.g. the 4:4:4 one, in which no interpretation of the chrominance signals is carried out, and the 4:2:0 one, where a vertical interpolation of the pixels is carried out, in addition to the horizontal one described previously.

Therefore the motion estimation method can be extended to other algorithms reducible to block-matching, like e.g. the search of the fractal matching.

The method of the invention, with reference to all the variants described above, can be implemented as part of a video-signal processing system (i.e. for image coding or image filtering), to obtain a signal used both for transmission according to known techniques thus obtaining a remarkable band saving, and for the purpose of a storage thereof with a remarkable storage-area saving (for instance on CD-ROM, MPEG standard).

From the above description of the method, a person skilled in the art is able to implement the method by means of high-level language programming (e.g. C++), and/or is also able to implement the hardware (i.e. with VLSI technique) or software level in machine language (Assembler for programmable microprocessor).

We claim:

1. Method of motion estimation for image sequences based upon determination of motion vectors according to image block-matching operations, characterized by comprising the steps of:

extracting, from a reference image, first significant parameters, once per each image;

extracting second significant parameters for each of subdivision blocks of an image on which a motion estimation is carried out;

matching of said first significant parameters with said second significant parameters of each block on a search area around said block, thus obtaining for each block a set of motion vectors on which a mean absolute error is calculated;

carrying out, for each block, a choice of motion vectors for which the mean absolute error is less than a given value;

carrying out, for each block, a block-matching on the pixels relative to selected vectors only.

2. Method of motion estimation for image sequences as in claim 1, characterized in that said first and second significant parameters are formed by combinations of luminance and chrominance signal components and of weighted discrete derivative functions thereof, integrated along determined paths of integration.

3. Method of motion estimation for image sequences as in claim 2, characterized in that said paths of integration are the horizontal and vertical axes, and that said second significant parameters are:

$$v[i,j] = yv[i,j] + k\_croma*(cbv[i,j] + crv[i,j])$$

$$h[i,j] = yh[i,j] + k\_croma*(cbh[i,j] + crh[i,j])$$

where: i,j are the indexes of pixels along said axes; jv, jh, cbv, cbh, crv, crh, are the vertical and horizontal components of the luminance and chrominance signals respectively, given by:

$$yv[i,j] = y[i*8][j] + \Sigma(y[i*8+k][j] + W*(y[i*8+k][j] - y[i*8+k-1][j]))$$

$$yh[i,j] = y[i][j*8] + \Sigma(y[i][j*8+k] + W*(yi[i][j*8+k] - y[i][j*8+k-1]))$$

$$cbv[i,j] = cb[i*8][j] + \Sigma(cb[i*8+k][j] + W*cb[i*8+k][j] - cb[i*8+k-1][j]))$$

$$cbh[i,j] = cb[i][j*8] + \Sigma(cb[i][j*8+k] + W*(cb[i][j*8+k] - cb[i][j*8+k-1]))$$

where crv[i][j] and crh[i][j] are obtained in a similar manner and k_croma and W are weighting constants.

4. Method of motion estimation for image sequences as in claim 2, characterized in that said paths of integration are the horizontal and vertical axes, and that said first significant parameters are:

$$V[i,j] = YV[i,j] + K\_croma*(CBV[i,j] + CRV[i,j])$$

$$H[i,j] = YH[i,j] + K\_croma*(CBH[i,j] + CRH[i,j])$$

where: i,j are the indexes of the pixels along said axes; YV, YH, CBV, CBH, CRV, CRH are vertical and horizontal components of the luminance and chrominance signals respectively given by:

$$YV[i,j]=Y[i][j]+\Sigma(Y[i+k][j]+W*(Y[i+k][j]-Y[i+k-1][j]))$$

$$YH[i,j]=Y[i][j]+\Sigma(Y[i][j+k]+W*(Y[i][j+k]-Y[i][j+k-1]))$$

where the vertical and horizontal components of the chrominance CRV[i,j], CBV[i,j], CRH[i,j] and CBH[i,j] are obtained in a similar way and K_croma and W are weighting constants.

5. Method of motion estimation for image sequences as in claim 1, characterized in that said matching of said first significant parameters with said second significant parameters of each block according to a calculation of a mean absolute error is of the following type:

$$MAE\_V[i,j]=\Sigma\Sigma|V[i+k1][j+k2]-v[k1][k2]|$$

$$MAE\_H[i,j]=\Sigma\Sigma|H[i+k1][j+k2]-h[k1][k2]|$$

where MAE_V and MAE_H represent the mean absolute error, while i=−hrange . . . ++h range, j=v range . . . +v range define the search area of the motion compensation and also the indexes of the motion vector.

6. Method of motion estimation for image sequences as in claim 1, characterized in that said matching of said first significant parameters with said second significant parameters of each block is inserted in an iterative procedure carrying out said matching not for all the extracted parameters, but only for the most significant ones, extracted according to a sampling operation, and repeating the operation at each step taking a greater number of parameters into account, but carrying out said matching only for those locations that gave the best results at the preceding step.

7. Method of motion estimation for image sequences as in claim 6, characterized in that said most significant parameters, at the first iteration, are those whereby:

$$V=\max(v[i,j]) \quad v=\min(v[i,j])$$

$$H=\max(h[i,j]) \quad h=\min(h[i,j])$$

the number of parameters being doubled and the number of locations of index i,j on which the matching is carried out being halved, at each iteration.

8. Method of motion estimation for image sequences as in claim 6, characterized in that the values of the mean absolute error (MAE) greater than their average value are discarded at the first iteration, thus approximating the mean absolute error (MAE) distribution to a Gaussian function, so that half of matchings are discarded.

9. Method of motion estimation for image sequences as in claim 6, characterized in that, at the subsequent iterations, having discarded the worst block-matchings in the first iteration, the distribution is no longer Gaussian, but is approximated by a linear distribution, the barycenter of which is calculated and used as a threshold for saving the block-matchings greater than the threshold.

10. Method of motion estimation for image sequences as in claim 3, characterized in that said weighting constant (W) is chosen equal to zero.

11. Method of motion estimation for image sequences as in claim 2, characterized in that said paths of integration can be oblique or broken lines according to paths defined in advance on the image or on the blocks.

\* \* \* \* \*